(12) United States Patent
Yamamoto

(10) Patent No.: US 6,308,200 B1
(45) Date of Patent: *Oct. 23, 2001

(54) METHOD FOR CONNECTING TERMINALS TO A HOST COMPUTER AND A HOST COMPUTER THEREFOR

(75) Inventor: Takashi Yamamoto, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/769,111

(22) Filed: Dec. 18, 1996

(30) Foreign Application Priority Data

Jul. 9, 1996 (JP) .................................. 8-179313

(51) Int. Cl.$^7$ .................................... G06F 15/16
(52) U.S. Cl. ........................... 709/206; 709/227
(58) Field of Search .................. 395/200.47, 200.48, 395/200.57, 200.58, 187.01, 188.01, 200.45, 234, 200.54; 358/402; 705/410, 39, 400, 52; 709/219, 224, 206, 207

(56) References Cited

U.S. PATENT DOCUMENTS

| | | | |
|---|---|---|---|
| 5,508,817 | * | 4/1996 | Kunigami ........................ 358/402 |
| 5,655,077 | * | 8/1997 | Jones et al. .................... 395/187.1 |
| 5,696,906 | * | 12/1997 | Peters et al. ..................... 395/234 |
| 5,742,932 | * | 4/1998 | Levitsky ............................ 705/410 |
| 5,768,521 | * | 6/1998 | Dedrick ........................ 395/200.54 |
| 5,774,551 | * | 6/1998 | Wu et al. ............................ 380/25 |
| 5,845,073 | * | 12/1998 | Carlin et al. ................. 395/200.47 |
| 5,852,812 | * | 12/1998 | Reeder ................................ 705/39 |
| 5,864,610 | * | 1/1999 | Ronen ................................ 379/127 |
| 5,881,234 | * | 3/1999 | Schwob ......................... 395/200.49 |
| 5,958,006 | * | 9/1999 | Eggleston et al. .................... 709/219 |

FOREIGN PATENT DOCUMENTS

| | | |
|---|---|---|
| 7-319792 | 12/1995 | (JP) . |
| 87/07801 | * 12/1987 | (WO) . |
| 96/17285 | * 6/1996 | (WO) . |

OTHER PUBLICATIONS

Online TidBits, http://members.aol.com/jimrazz/tidbits.txt, Aug. 24, 1996, pp. 1–5.*
Netcom, http://www.netcom.com/bin/webtech/NETCOM_Accounts/Dialers/pound.sign.html, Aug. 11, 1997.*
Columbia University, http://www.columbia.edu/acis/networks/netcom/netcom.config.win.html, Sep. 24, 1996.*

* cited by examiner

Primary Examiner—Glenton B. Burgess
Assistant Examiner—Bradley Edelman
(74) Attorney, Agent, or Firm—Staas & Halsey LLP

(57) ABSTRACT

A method for connecting terminals to a host computer via communication lines in a computer network, and a host computer therefor, which simplifies an operation to confirm mail receipt, reduces network traffic by not executing a log-in process, and does not initiate charges for an on-line service fee for mail receipt confirmation when mail has not been received. The method includes inputting an identification number and a password of a user of the host computer from one of the terminals to the host computer, and determining whether the password is for confirming that information addressed to the user has been stored in the host computer. When the password is for confirming that information addressed to the user has been stored in the host computer, a determination is made as to whether information has been stored in the host computer, and the user is enabled to use the host computer when information has been stored in the host computer.

9 Claims, 10 Drawing Sheets

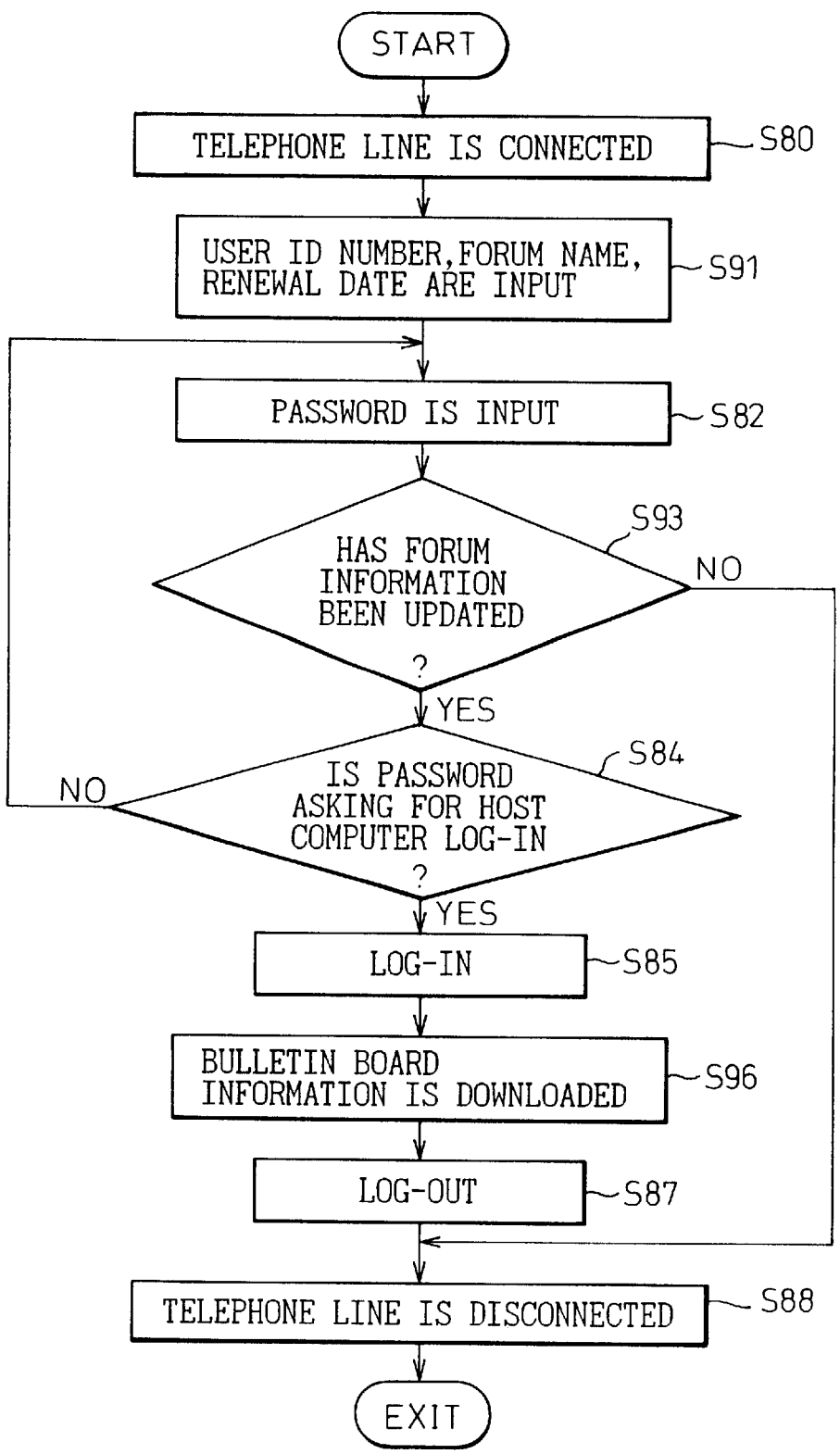

METHOD FOR CONNECTING TERMINALS TO A HOST COMPUTER AND A HOST COMPUTER THEREFOR

BACKGROUND OF THE INVENTION

1. Field of the Invention

The present invention relates to a computer network and, particularly, to a method for connecting terminals to a host computer and a host computer therefor, in a computer network that includes the host computer and a plurality of terminals connected to the host computer via communication lines.

2. Related Arts

An on-line system which provides various kinds of services from a host computer to terminal operators, registered to use the host computer, in a computer network which includes the host computer and a plurality of terminals connected to the host computer via communication lines, has been known. A system commonly referred to as a "personal computer communication" system, which allows a number of people to communicate with each other using data communication between the host computer and the terminals is an example of such an on-line system. In such a system, for example, personal computers are used as terminals and telephone lines are used as the communication lines. As typical usage of the personal computer communication system, the electronic mail system (hereinafter simply referred to as an e-mail system) that transmits a message from a user to one or more of other designated users, the electronic bulletin board that allows users to read and write messages on the board to one another, and the like, are provided. The electronic bulletin boards are provided for different kinds of groups, called forums, each having a plurality of users interested in a particular theme.

The query whether or not an e-mail message has been received has been done as follows: first, an operator of a terminal, namely, a user of a host computer makes a telephone call to the host computer to connect the telephone communication line when the user asks whether or not mail to his or her address has been received. Then, the user inputs his or her identification ID number and a password, thereby enabling the user to use the host computer and at the same time starting to count the charge for making use of the host computer. It is called a log-in process to enable a terminal user to start to use the host computer, while it is called a log-out process to end the use of the host computer. After carrying out the log-in process, the user can search for an e-mail addressed to him or her by manipulating the host computer. The user downloads the message from the host computer to his or her terminal when the user finds mail, while the user stops using the host computer when the user does not find mail.

However, the above explained query of whether or not mail has been received cannot be answered until the user finishes a mail search operation after executing the log-in process. The users are required to manipulate the mail search operation, and the on-line service charge for making use of the host computer is counted during the search operation, resulting in increased network traffic. Furthermore, when a terminal operator that made registration to a plurality of host computers asks whether or not his or her mail has been received by each respective host computer, the operator, namely, the user of the host computers is required to repeatedly operate a similar mail search operation corresponding to each of the host computers. This is time consuming and inefficient in operation.

SUMMARY OF THE INVENTION

The present invention has been made in view of the foregoing problems and it is therefore an object of the present invention to provide a method for connecting terminals to a host computer, and a host computer therefor, in a computer network in which the network includes the host computer and a plurality of terminals connected to the host computer via communication lines, wherein a user having made a registration to the host computer can confirm whether or not a mail addressed to the user has been received by a simple operation, the terminal can be connected to the host computer and the charge for making use of the host computer, namely, the on line service charge starts only when the mail has been received, thereby improving the efficiency in operation and reducing the network traffic.

FIG. 1 is a flowchart showing a basic process of a first connecting method of the present invention. From FIG. 1, the number after S indicates a step number. In order to accomplish the above object, a first method for connecting terminals to a host computer in a computer network that includes the host computer and a plurality of terminals connected to the host computer via communication lines is characterized in that it comprises the following steps.

Step 1: An identification number and a password of a user of the host computer are input from one of the terminals to the host computer after connecting a communication line between the terminal and the host computer (S1).

Step 2: An execution of a process, for example, transmitting whether forecast or road traffic information, or the like, is started for the user by the host computer, in which the process corresponding to the input password is selected from a plurality of processes, each process respectively corresponds to each password and is previously defined by the host computer (S2).

FIG. 2 is a flowchart showing a processing sequence according to a second connecting method of the present invention. In order to accomplish the above object, a second method for connecting terminals to a host computer in a computer network that includes the host computer and a plurality of terminals connected to the host computer via communication lines is characterized in that it comprises the following steps.

Step 21: An identification number and a password of a user of the host computer are input from one of the terminals to the host computer (S21).

Step 22: It is determined whether or not the password is the one for confirming that information addressed to the user has been stored in the host computer (S22). The process proceeds to step S23 if it is determined yes, whereas the process ends if it is determined no.

Step 23: It is determined whether or not information addressed to the user has been stored in the host computer when it is determined in the step S22 that the password is input for the confirmation (S23). The process proceeds to step S24 if it is determined yes, whereas the process ends if it is determined no.

Step 24: The user is enabled to use the host computer when it is determined that the information has been stored in the host computer (S24).

In the first or second method for connecting terminals to a host computer, the password may be replaced by a prefix or a suffix placed in front of or at the back of the identification number respectively.

In the second method for connecting terminals to a host computer, the information received by the host computer may be one or more of electronic mails addressed to the user.

FIG. 3 is a flowchart showing a processing sequence according to a third connecting method of the present invention. In order to accomplish the above object, a third method for connecting terminals to a host computer in a computer network that includes the host computer a plurality of terminals connected to the host computer via communication lines is characterized in that it comprises the following steps.

Step 31: An identification number of a user of the host computer and a forum name are input from one of the terminals to the host computer, to which forum the user belongs (S31).

Step 32: It is determined whether or not the forum name is input for confirming that information addressed to the forum has been stored in the host computer (S32). The process proceeds to step S33 if it is determined yes, whereas the process ends if it is determined no.

Step 33: It is determined whether or not information addressed to the forum has been stored in the host computer when it is determined in the step S32 that the forum name is input for the confirmation (S33). The process proceeds to step S34 if it is determined yes, whereas the process ends if it is determined no.

Step 34: The user is enabled to use the host computer when it is determined in the step S33 that the information has been stored in the host computer (S34).

FIG. 4 is a flowchart showing a processing sequence according to a fourth connecting method of the present invention. In order to accomplish the above object, a fourth method for connecting terminals to a host computer in a computer network that includes the host computer and a plurality of terminals connected to the host computer via communication lines is characterized in that it comprises the following steps.

Step 41: An identification number of a user of the host computer, a forum name and a renewal date of the forum information from one of the terminals to the host computer are input from one of the terminals to the host computer, to which forum the user belongs (S41).

Step 42: It is determined whether or not the forum name is input for confirming that information addressed to the forum has been stored in the host computer (S42). The process proceeds to step S43 if it is determined yes, whereas the process ends if it is determined no.

Step 43: It is determined whether or not information addressed to the forum has been stored in the host computer when it is determined in the step S42 that the forum name is input for the confirmation (S43). The process proceeds to step S44 if it is determined yes, whereas the process ends if it is determined no.

Step 44: Receipt date of the information addressed to the forum is compared with the renewal date when it is determined in the step S43 that the information has been stored in the host computer (S44). The process proceeds to step S45 if the receipt date is newer than the renewal date, whereas the process ends if the receipt date is not newer than the renewal date.

Step 45: The user is enabled to use the host computer (S45).

FIG. 5 is a flowchart showing a processing sequence according to a fifth connecting method of the present invention. In order to accomplish the above object, a fifth method for connecting terminals to a host computer in a computer network that includes the host computer and a plurality of terminals connected to the host computer via communication lines is characterized in that it comprises the following steps.

Step 51: An identification number of a user of the host computer, a forum name and a reference version number of the forum information are input from one of the terminals to the host computer, to which forum the user belongs (S51).

Step 52: It is determined whether or not the forum name is input for confirming that information addressed to the forum has been stored in the host computer (S52). The process proceeds to step S53 if it is determined yes, whereas the process ends if it is determined no.

Step 53: It is determined whether or not information addressed to the forum has been stored in the host computer when it is determined in the step S52 that the forum name is input for the confirmation (S53). The process proceeds to step S54 if it is determined yes, whereas the process ends if it is determined no.

Step 54: A version number read from the information addressed to the forum is compared with the reference version number when it is determined in the step S53 that the information addressed to the forum has been stored in the host computer (S54). The process proceeds to step S55 if the version number read from the information is newer than the reference version number, whereas the process ends if the version number is not newer than the reference version number.

Step 55: The user is enabled to use the host computer (S55).

FIG. 6 is a block diagram showing a constitution of a host computer according to the present invention. In order to accomplish the above object, a host computer that connects a terminal in a computer network including the host computer and a plurality of terminals connected to the host computer via communication lines is characterized in that it comprises:

(a) a receiving means for receiving an identification number and a password of a user of the host computer input from one of the terminals to the host computer;

(b) a first determining means for determining whether or not the password is input for a request for confirming that information addressed to the user has been stored in the host computer;

(c) a second determining means for determining whether or not information addressed to the user has been stored in the host computer when the first determining means determines that the password is input for the request; and (d) a means for connecting the terminal and the host computer, thereby enabling the user to use the host computer when the second determining means determines that the information addressed to the user has been stored in the host computer.

In order to accomplish the above object, there is provided another host computer for determining whether or not a permission to use the host computer should be given to a user based on an identification number and a password of the user of the host computer, comprising:

(a) a memory means for storing identification numbers and the corresponding passwords given to users of the host computer; and (b) a connecting means for starting to execute a process corresponding to the input password for the user, in which the process is selected from a plurality of processes, each process respectively corresponds to each password and is previously defined by the host computer when the input identification number is stored in the memory means and the input password matches to one of passwords corresponding to the input identification numbers.

In order to accomplish the above object, there is provided still another host computer for determining whether or not a permission to use the host computer should be given to a user based on input data such as an identification number and a password of the user of the host computer, comprising:

(a) a memory means for storing identification numbers, a first password and a second password both corresponding to the identification numbers, given to users of the host computer; and (b) a connecting means for outputting information to a terminal stating that information addressed to the user is stored in the host computer, and starting services to the user, if it is determined that information addressed to the user corresponding to the input identification number is stored in the memory means when the input identification number is stored in the memory means and the input password matches the first password corresponding to the input identification number, and the connecting means starts services to the user regardless of the existence of the information addressed to the user corresponding to the input identification number in the memory means when the input identification number is stored in the memory means and the input password matches the second password corresponding to the input identification number.

BRIEF DESCRIPTION OF THE DRAWINGS

The present invention will be more clearly understood from the description as set forth below with reference to the accompanying drawings, wherein:

FIG. 10 is a flowchart showing a process to read an electronic bulletin board according to a third embodiment of the present invention.

DESCRIPTION OF THE PREFERRED EMBODIMENTS

The preferred embodiments of the present invention will be described below with reference to the accompanying drawings.

Figure 1:
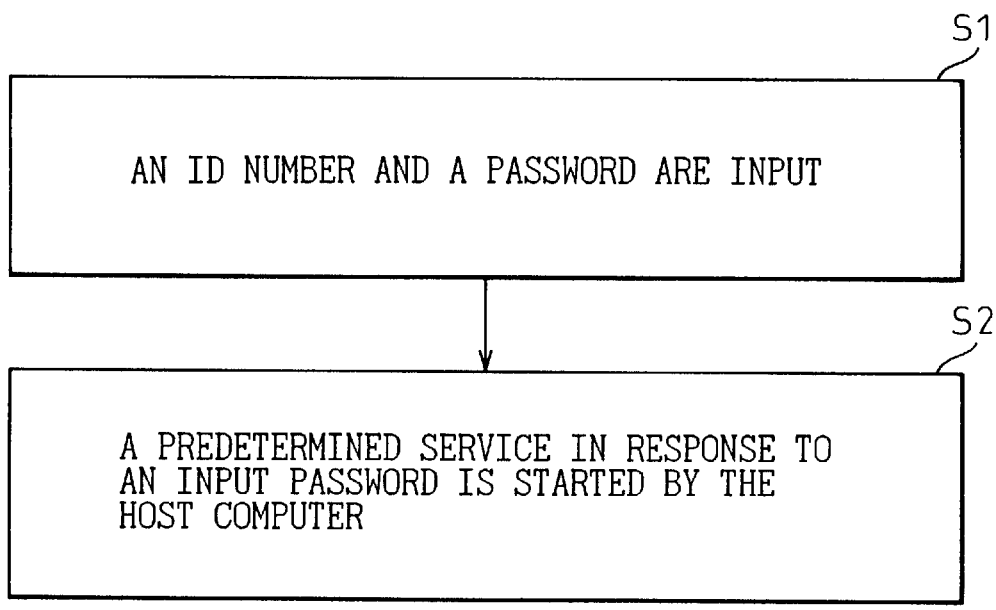
FIG. 1 is a flowchart showing a basic process of a first connecting method of the present invention.
Figure 2:
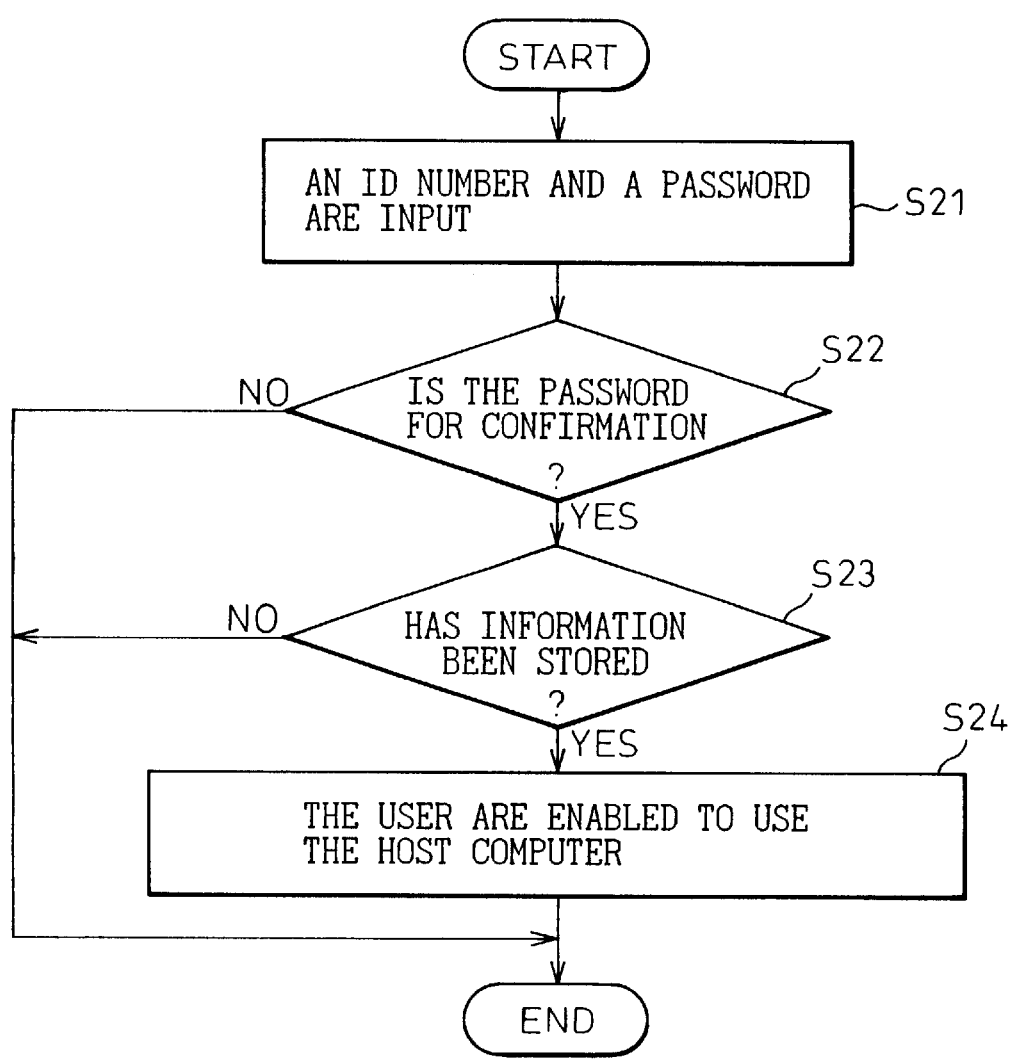
FIG. 2 is a flowchart showing a processing sequence according to a second connecting method of the present invention.
Figure 3:
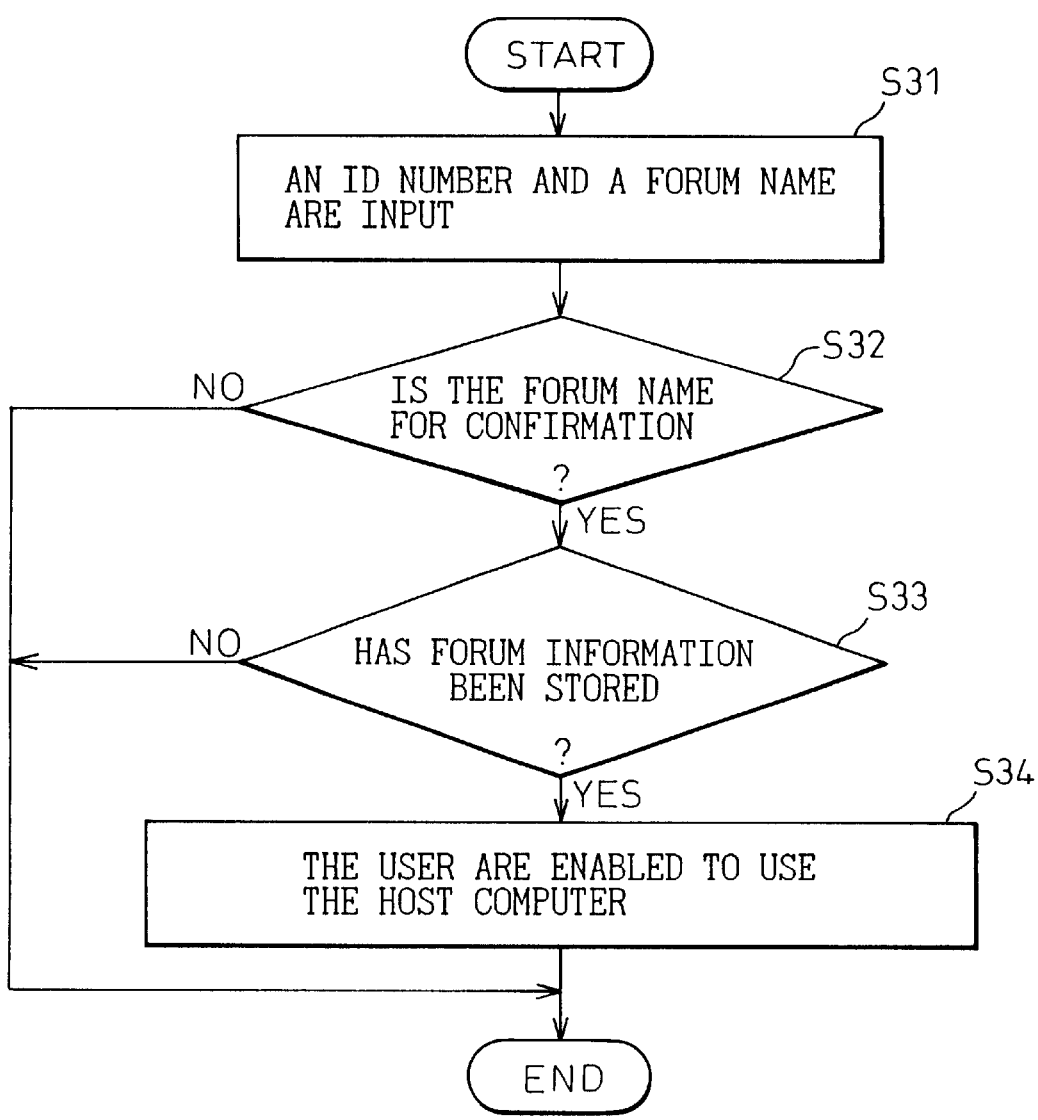
FIG. 3 is a flowchart showing a processing sequence according to a third connecting method of the present invention.
Figure 4:
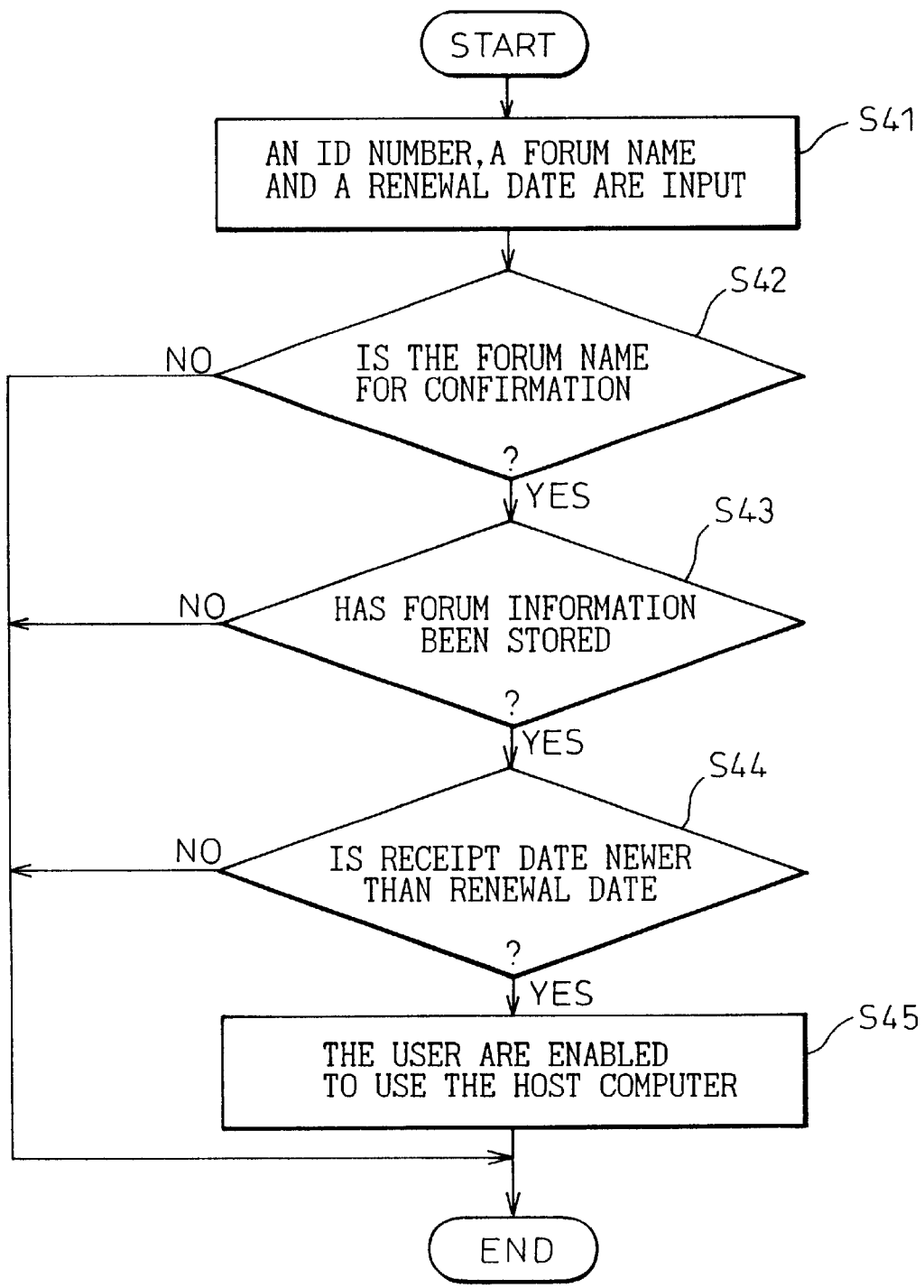
FIG. 4 is a flowchart showing a processing sequence according to a fourth connecting method of the present invention.
Figure 5:
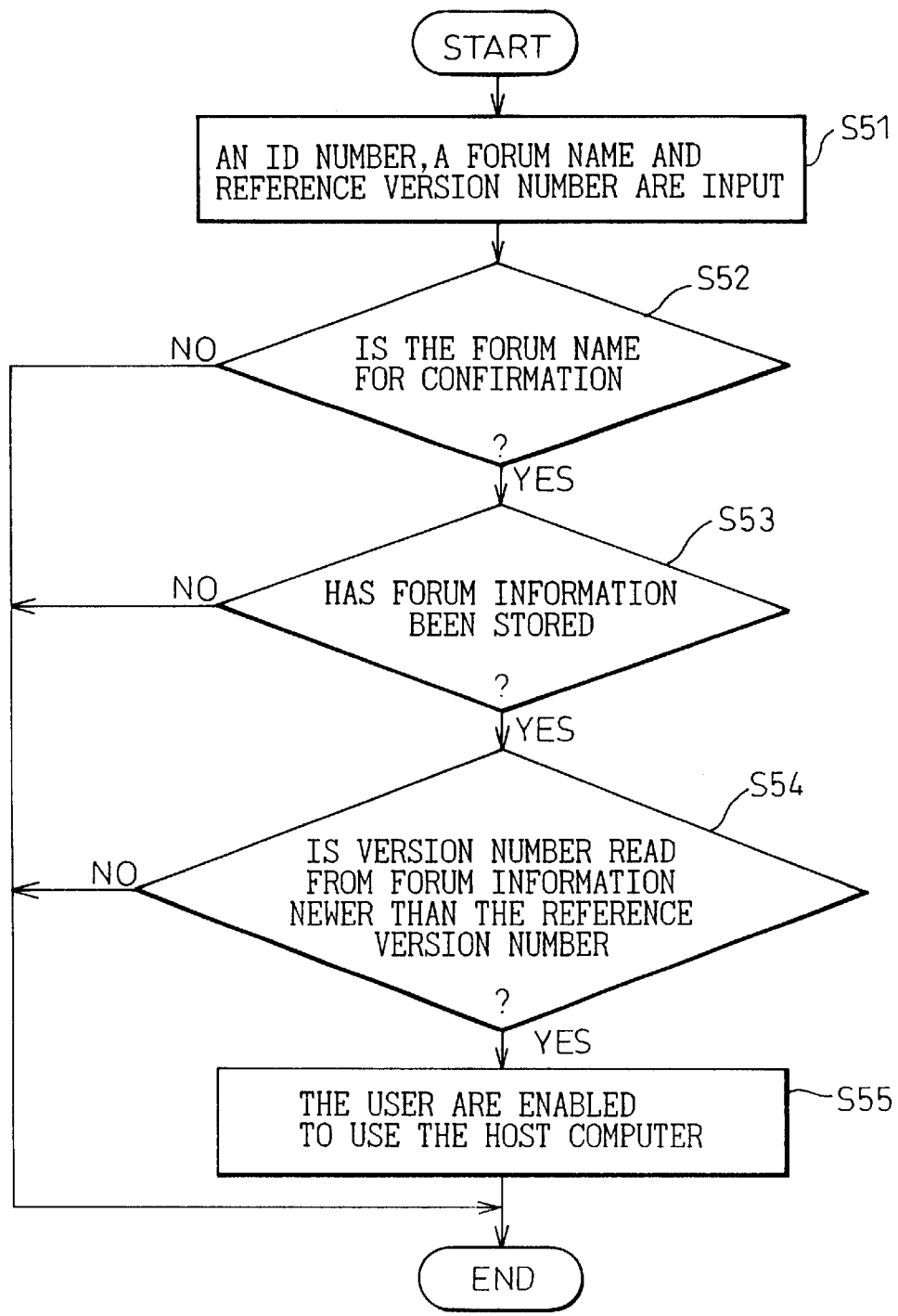
FIG. 5 is a flowchart showing a processing sequence according to a fifth connecting method of the present invention.
Figure 6:
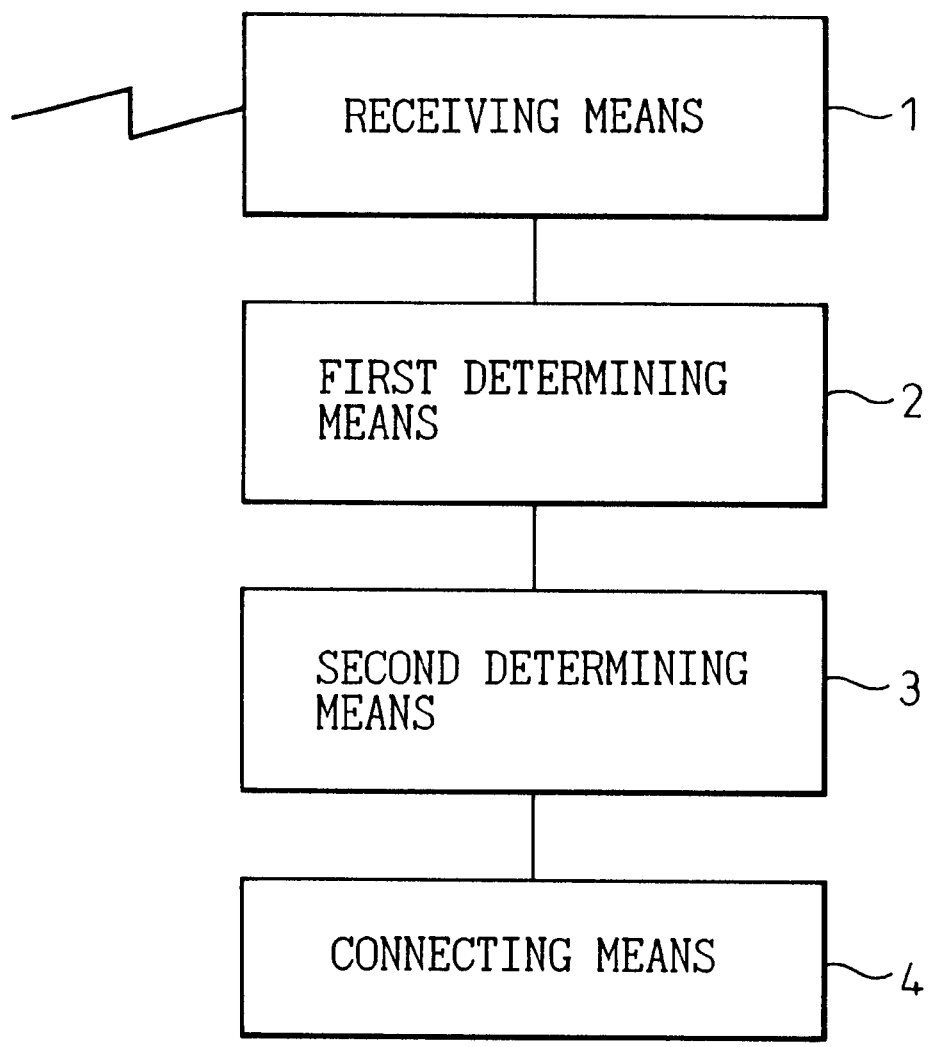
FIG. 6 is a block diagram showing a constitution of a host computer according to the present invention.
Figure 7:
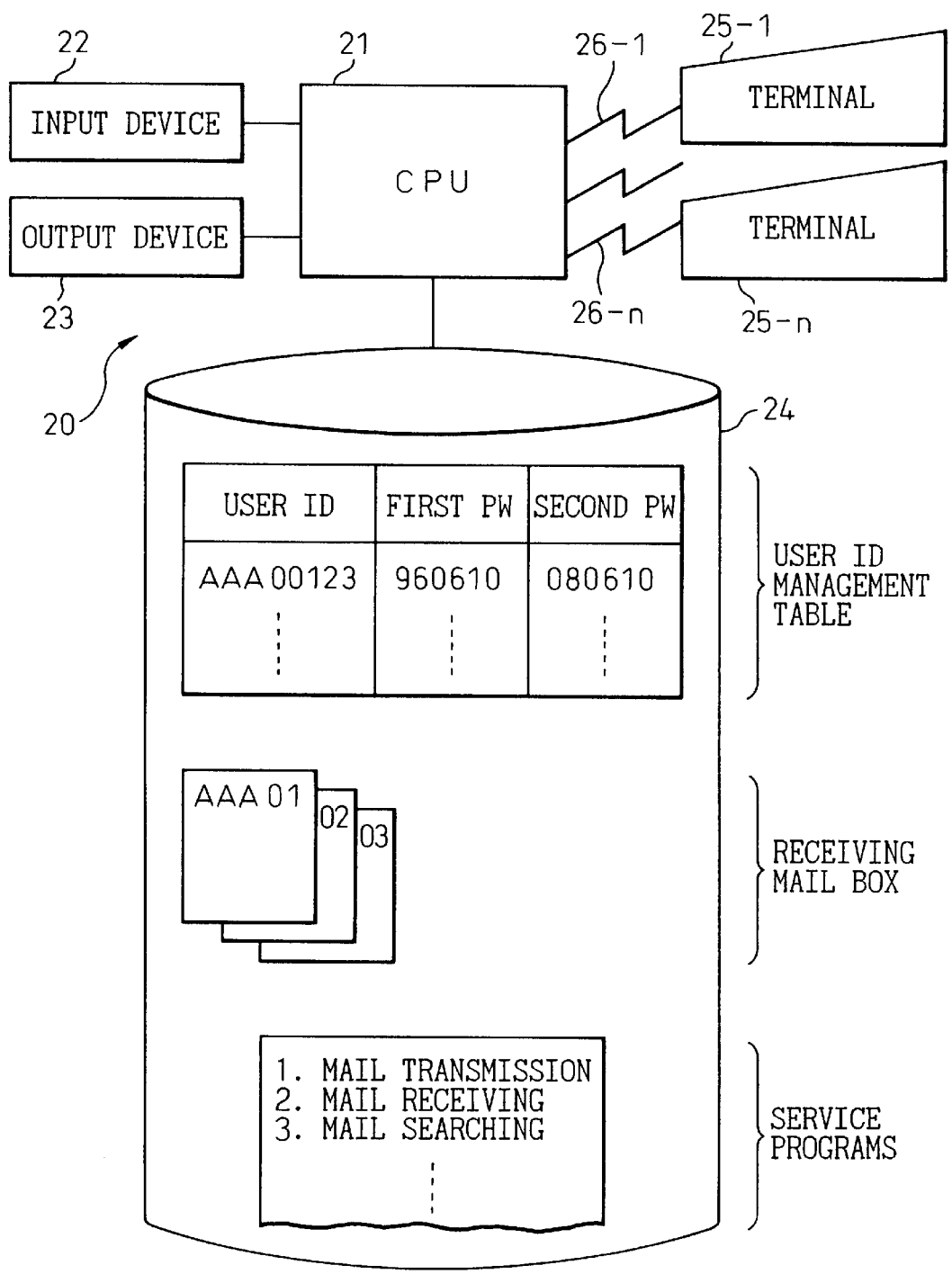
FIG. 7 is a schematic diagram showing a constitution according to an embodiment of the present invention.

FIG. 7 is a schematic diagram showing a constitution according to an embodiment of the present invention. FIG. 7 shows a host computer 20 as a whole. The host computer 20 includes a main memory unit, a central control unit (CPU) 21 having an arithmetic control unit and the like, an input device 22 having a mouse, a keyboard, etc., an output device 23 having a cathode-ray tube (CRT), a printer, etc., and an auxiliary memory unit 24 having, for example, a magnetic disc. The host computer 20 is connected to a plurality of terminals 25-1, 25-2, 25-n via respective communication lines 26-1, 26-2, . . . , 26-n. In this embodiment, a telephone network is used as communication lines. Users having made registration to use the host computer 20 are respectively given identification (ID) numbers for identifying respective users, and two passwords. The first password is used for confirming whether or not at least an electronic mail addressed to a user has been received by the host computer 20, and the data of the mail has been stored in a memory area of the auxiliary memory unit 24. The second password is used for requesting a permission to use the host computer 20. In the auxiliary memory unit 24, a user management table is provided for storing data related to the user ID numbers, the first password and the second password correspondingly. In the auxiliary memory unit 24, another area called a receiving mail box for storing user files is provided, in which each user file is provided for storing data addressed to the user, and has respective file name starting from the user ID number to distinguish the user file from the other user files. Furthermore, service programs such as mail transmitting, ail receiving, mail searching, etc. are also stored in the auxiliary memory unit 24 for operators of the terminals. Hereinafter, a mail receipt confirmation process will be explained.

Figure 8:
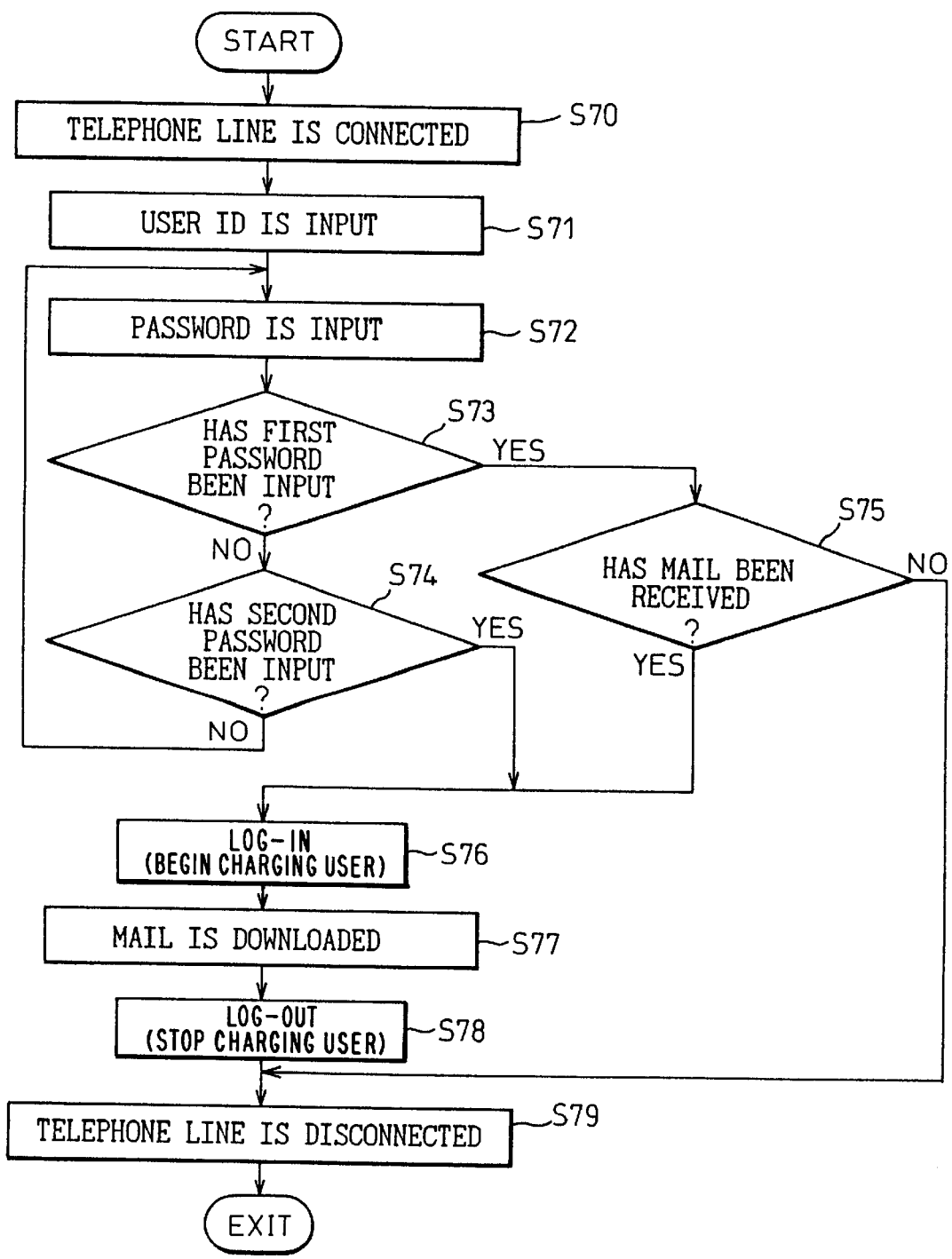
FIG. 8 is a flowchart showing a process to confirm an electronic mail receipt according to a first embodiment of the present invention.

FIG. 8 is a flowchart showing a process to confirm an electronic mail receipt according to a first embodiment of the present invention. This embodiment shows a process to confirm whether or not electronic mail addressed to a user has been received by the host computer. The host computer is connected to the user terminal so that the user can begin to use the host computer, namely, a log-in process is executed, when mail has been received. The host computer is not connected to the user terminal, namely, a log-in process is not to executed, when mail has not been received. First, a user makes a telephone call to the host computer to connect the telephone line between the host computer and the terminal in step S70. Then, the operator of the terminal inputs a user ID number, for example, AAA00123 in step S71 and a first password, for example, 960610, or a second password, for example, 080610 in step S72.

In step S73, the host computer determines whether or not the password input in step S72 is the first password that is registered for the purpose of confirming whether or not information addressed to the user has been received by the host computer and the information has been stored in a memory unit of the host computer. If the result is yes, the process proceeds to step S75, if the result is no, the process proceeds to step S74. In step S74, the host computer determines whether or not the password input in step S72 is the second password that is inherently used for requesting a permission to use the host computer. If the result is yes, the log-in process is executed so that the user can start to use the host computer in step S76. If the result is no, the process returns to step S72.

On the other hand, in step S75, whether or not information addressed to the user has been received by the host computer is determined, namely, whether or not mail addressed to the user has been stored in the receiving mail box is determined.

In this embodiment, this process is carried out by determining whether or not a file having a name starting with AAA is stored in a memory area that is a receiving mail box in step S75. If it is determined yes in step S75, the log-in process is executed in step S76, if it is determined no in step S75, the communication line is disconnected in step S79. After executing the log-in process in step S76, the user downloads a file stored in the receiving mail box and having a file name started with AAA, namely, the e-mail addressed to the user, from the host computer to the terminal in step S77. In step S78, the user is terminated by the host computer, namely log-out process is executed. In step S79, the user disconnects the communication line.

In the first embodiment explained above, a message that informs "no mail received" may be transmitted from the host computer to the terminal and displayed on a screen in a display unit of the terminal instead of disconnecting the communication line between the host computer and the terminal when it is determined that mail addressed to the user is not stored in the receiving mail box in step S75. By the way, charge for a terminal user to use the host computer is counted for a period from the log-in process to the log-out process. Thus, the charge for the user to use the host computer for a period of time spent to confirm whether or not mail addressed to the user has been stored in the receiving mail box in the host computer in step S75, is counted according to the prior art even if mail addressed to the user has not been received by the host computer. On the other hand, this charge is not counted according to the present invention. In addition, the log-in process is not also executed if mail addressed to the user has not been received by the host computer according to the present invention, thus a network traffic jam can be relieved.

Figure 9:
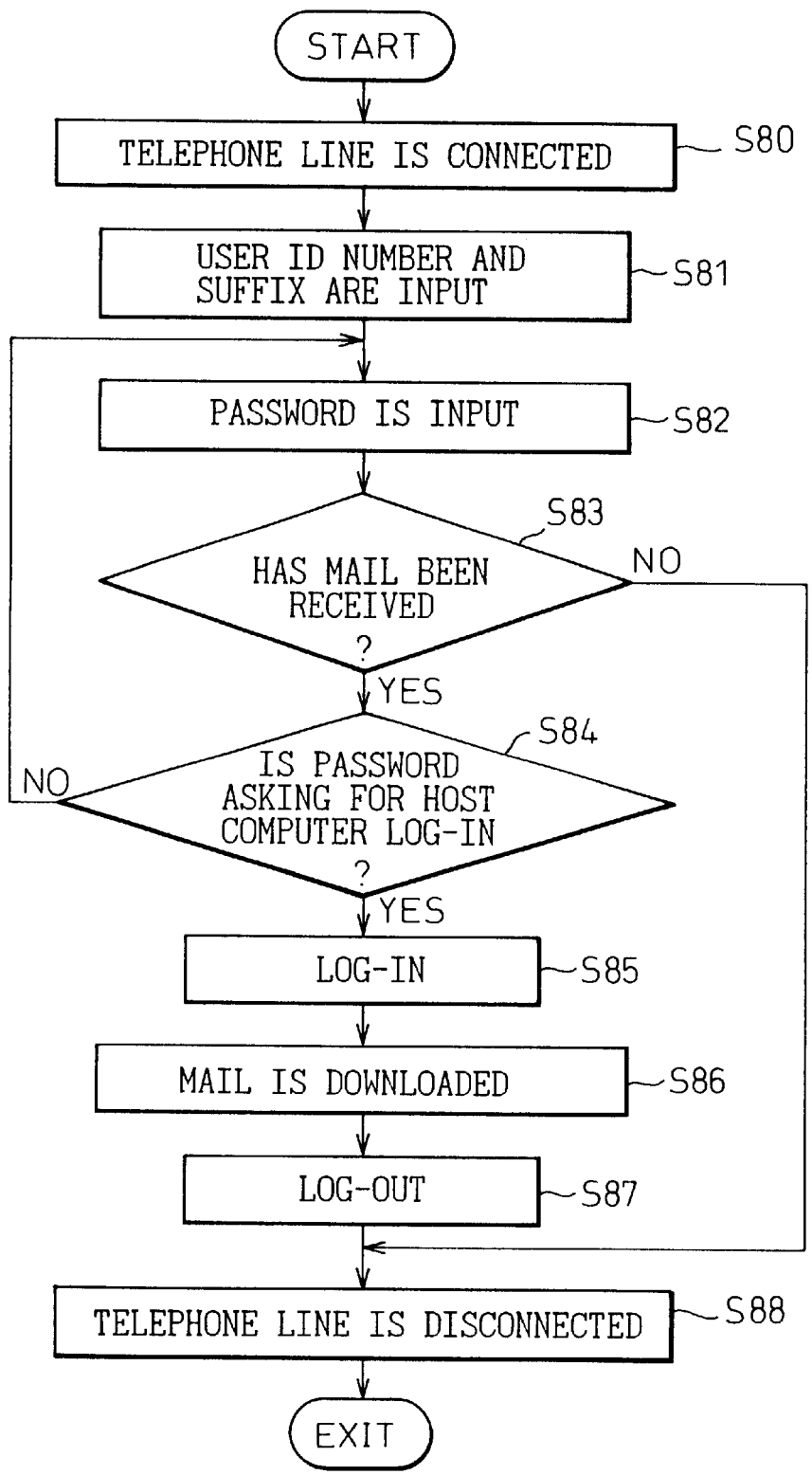
FIG. 9 is a flowchart showing a process to confirm an electronic mail receipt according to a second embodiment of the present invention.

FIG. 9 is a flowchart showing a process to confirm receipt of electronic mail according to a second embodiment of the present invention. This embodiment shows a process to confirm whether or not a mail addressed to a user has been received by the host computer by using a suffix, for example, "mail" following after the user ID Number, instead of the first password which is used in the first embodiment. In the process, the host computer reads the suffix "mail", determines that the user is asking whether or not mail addressed to the user has been received in the mail box of the host computer. A log-in process is executed when the host computer determines that mail has been received, and a log-in process is not executed when the host computer determines that mail has not been received. First, the user makes a telephone call to the host computer and connects the telephone line between the host computer and the terminal in step S80. Then, the operator of the terminal inputs the user ID number, for example, AAA00123 with a suffix, for example, "mail" in step S81, and inputs the second password, for example, 080610 that is inherently used for requesting a permission to use the host computer in step S82.

In step S83, it is determined whether or not information addressed to the user has been received by the host computer in the same way as step S75 in the first embodiment. The process proceeds to step S84 if the result is yes, and the communication line is disconnected in step S88 if the result is no. In step S84, the host computer determines whether or not the password input in step S82 is the one for asking permission to use the host computer by the user. The log-in process that enables the user to operate the host computer is executed in step S85 if the result in step S88 is yes, and the process returns to step S82 if the result in step S88 is no. After the log-in process is executed in step S85, the user downloads the file of which file number starts with AAA, namely, electronic mail addressed to the user, from the host computer to the terminal of the user in step S86 in the same way as in the first embodiment. Then, the user is terminated by the host computer, namely, the log-out process is executed in step S87. Then, the user disconnects the communication line in step S88.

So far, a process to confirm an electronic mail receipt has been explained with reference to FIGS. 8 and 9. However, the present invention can also be applied to a process to read an electronic bulletin board as the other embodiment, by which process information on the bulletin board is downloaded to a terminal of a user only when the information is updated. In this embodiment, forum name registered in the host computer is input instead of the first password explained before. This example will be explained below with reference to FIG. 10.

FIG. 10 is a flowchart showing a process to read an electronic bulletin board according to a third embodiment of the present invention. The flowchart shown in FIG. 10 is same as the flowchart shown in FIG. 9 of the second embodiment except that steps S81, 83 and 86 in FIG. 9 are replaced by the steps S91, 93 and 96 in FIG. 10. Therefore, these steps S91, 93 and 96 will be mainly explained below. First, instead of using the first password as used in the first embodiment, a forum name to which the terminal user belongs, for example, BASEBALL and the renewal date, for example, 10/06/1996, are additionally input right after the user ID number in step S91. The host computer reads the forum name BASEBALL and the renewal date 10/06/1996 and determines whether or not newly updated information addressed to the forum BASEBALL has been received and rewritten on the electronic bulletin board in step S93. The process proceeds to step S84 if the result in step S93 is yes, while the process proceeds to step S88 if the result in step S93 is no. In step S84, the host computer determines whether or not the password input in step S82 is the one for requsting permission to use the host computer by the user. The log-in process that enables the user to operate the host computer is executed in step S85 if the result in step S88 is yes, and the process returns to step S82 if the result in step S88 is no. Then, the log-in process is executed in step S85, the information on the electronic bulletin board with regard to the forum is downloaded from the host computer to the terminal in step S96, then the log-out process is executed in step S87. On the other hand, the communication line is disconnected without executing the log-in process in step S88 if the result in step S93 is no, namely if it is determined that such information has not been received.

Furthermore, other embodiments can be considered, in which a reference version number, for example, V. 2.0, may be input as a substitute of the renewal date in step S91 in FIG. 10, then the host computer reads the forum name BASEBALL and the version number V. 2.0 in step S93 in FIG. 10 and determines whether or not the updated version number, for example, V. 3.0, addressed to the forum BASEBALL, which is newer than the version number V. 2.0, has been received and rewritten on the electronic bulletin board. Then, the updated version number V. 3.0 read from the information addressed to the forum name BASEBALL is compared with the reference version number V. 2.0. The log-in process is executed if the updated version number, for example, V. 3.0 is newer than the version number V. 2.0, and the log-out process is executed if the read version number, for example, V. 2.0 is not newer than the version number V. 2.0.

Heretofore, embodiments related to a computer network using telephone lines as a communication means has been explained, however, the present invention can also be applied to a LAN (local area network) having a host computer and a plurality of terminals connected hereto through digital communication lines distributed in a local area. In this application to LAN, most of operations are same as the embodiments explained above except that such operations as to connect and disconnect the telephone lines are not required. Furthermore, the present invention can also applied to a global network including an internet that connects a plurality of computer networks using telephone lines and a plurality of local area networks in which one of terminals can communicate with one of host computers.

As heretofore explained, according to a method for connecting terminals to a host computer and a host computer therefor of the present invention, users can enjoy special services such as e-mail receipt confirmation, electronic bulletin board renewal confirmation, a weather forecast report and the like, from a host computer with a simple operation, for example, inputting an ID number and a password of the user of the host computer, thereby reducing operating time and releasing the users from repeating monotonous operations. In addition, according to the present invention, the log-in operation will not be executed when it is determined that e-mail has not been received by the user as a result of the execution of the e-mail receipt confirmation process, or when it is determined that information on the electronic bulletin board has not been renewed as a result of the execution of the electronic bulletin board renewal confirmation process. As a result expenses for the use of the host computer are not charged since the log-in process is not executed, and a network traffic jam can be relieved.

It will be understood by those skilled in the art that the foregoing description is directed to preferred embodiments of the disclosed method, apparatus, and host computer, and that various changes and modifications may be made in the invention without departing from the spirit and scope thereof.

What is claimed is:

1. A method for connecting terminals to a host computer in a computer network that includes said host computer and a plurality of terminals connected to said host computer via communication lines, comprising:

receiving a user identification and an input password of a user of said host computer from one of said terminals to said host computer, said input password being selected from plural passwords previously defined for said user and respectively corresponding to plural processes defined for said host computer;

determining whether said input password corresponds to a confirmation process for confirming that information addressed to said user has been stored in said host computer;

determining whether information addressed to said user has been stored in said host computer when said input password is determined to correspond to said confirmation process;

initiating charges for said user to use said host computer when said information is determined to be stored in said host computer; and disconnecting said user's terminal and said host computer without initiating charges when it is determined that said information has not been stored in said host computer.

2. A method for connecting terminals to a host computer in a computer network that includes said host computer and a plurality of terminals connected to said host computer via communication lines, comprising:

inputting a prefix preceding or a suffix following a user identification, and an input password of a user of said host computer from one of said terminals to said host computer, said input password being selected from plural passwords previously defined for said user and respectively corresponding to plural processes defined for said host computer;

determining whether said input password corresponds to a confirmation process and said prefix or suffix corresponds to a respective process for confirming that information addressed to said user has been stored in said host computer;

determining whether the information addressed to said user has been stored in said host computer when said input password is determined to correspond to said confirmation process and said prefix or suffix is determined to correspond to said respective process;

initiating charges for said user to use said host computer when said information is determined to be stored in said host computer; and disconnecting said user's terminal and said host computer without initiating charges when it is determined that said information has not been stored in said host computer.

3. A method for connecting terminals to a host computer according to claim 2, wherein said information is electronic mail addressed to said user.

4. A method for connecting terminals to a host computer in a computer network that includes the host computer and a plurality of terminals connected to the host computer via communication lines, comprising:

inputting a user identification of a user of said host computer and a forum name, from one of said terminals to said host computer, said forum name corresponding to a forum to which said user belongs;

determining whether said forum name corresponds to a process for confirming that information addressed to said forum has been stored in said host computer, said confirmation process being comprised among plural processes defined for said host computer and respectively corresponding to predefined input alternatives for accessing said host computer;

determining whether information addressed to said forum has been stored in said host computer when said forum name is determined to correspond to said confirmation process;

initiating charges for said user to use said host computer when said information is determined to be stored in said host computer; and disconnecting said user's terminal and said host computer without initiating charges when it is determined that said information has not been stored in said host computer.

5. A method for connecting terminals to a host computer in a computer network that includes said host computer and a plurality of terminals connected to said host computer via communication lines, comprising:

inputting a user identification of a user of said host computer, a forum name corresponding to a forum to which said user belongs, and a renewal date of forum information for said forum, from one of said terminals to said host computer;

determining whether said forum name corresponds to a process for confirming that information addressed to said forum has been stored in said host computer, said confirmation process being comprised among plural processes defined for said host computer and respectively corresponding to predefined input alternatives for requesting access to said host computer;

determining whether information addressed to said forum has been stored in said host computer when said forum name is determined to correspond to said confirmation process;

comparing a receipt date of said information addressed to said forum with said renewal date when said information is determined to be stored in said host computer;

initiating charges for said user to use said host computer when said receipt date is newer than said renewal date; and disconnecting said user's terminal and said host computer without initiating charges when said receipt date is not newer than said renewal date.

6. A method for connecting terminals to a host computer in a computer network that includes the host computer and a plurality of terminals connected to the host computer via communication lines, comprising:

inputting, from one of said terminals to said host computer, a user identification of a user of said host computer, a forum name, and a reference version number of forum information corresponding to a forum to which said user belongs;

determining whether said forum name corresponds to a process for confirming that information addressed to said forum has been stored in said host computer, said confirmation process being comprised among plural processes defined for said host computer and respectively corresponding to predefined input alternatives for requesting access to said host computer;

determining whether information addressed to said forum has been stored in said host computer when said forum name is determined to correspond to said confirmation process;

comparing a version number read from said information addressed to said forum with said reference version number when said information addressed to said forum is determined to be stored in said host computer;

initiating charges for said user to use said host computer when said version number read from said information is newer than said reference version number; and disconnecting said user's terminal and said host computer without initiating charges when said version number is not newer than said reference version number.

7. A host computer that connects a terminal in a computer network including the host computer and a plurality of terminals connected to the host computer via communication lines, comprising:

receiving means for receiving a user identification and a password of a user of said host computer input from one of said terminals to said host computer, said input password being selected from plural passwords previously defined for said user and respectively corresponding to plural requests defined for said host computer;

first determining means for determining whether said input password corresponds to a request for confirming that information addressed to said user has been stored in said host computer;

second determining means for determining whether information addressed to said user has been stored in said host computer when said first determining means determines that said input password corresponds to said request; and means for connecting one of said plurality of terminals and said host computer, and for initiating charges for said user to use said host computer when said second determining means determines that the information addressed to said user has been stored in said host computer, and for disconnecting said user's terminal and said host computer without initiating charges when it is determined that said information has not been stored in said host computer.

8. A host computer of a computer network, comprising:

means for determining whether information addressed to a user has been stored in said host computer in response to input information selected from predefined input alternatives respectively corresponding to processes defined for requesting access to said host computer;

means for initiating charges for use of said host computer to the user in response to said determining means determining information addressed to the user is stored in the host computer; and means for disconnecting the user from said host computer without initiating charges when it is determined that the information addressed to the user is not stored in said host computer.

9. A method for connecting terminals to a host computer in a computer network that includes said host computer and a plurality of terminals connected to said host computer via communication lines, comprising:

receiving input information from one of said terminals at said host computer, said input information including user identification of a user of said host computer, a prefix or a suffix thereto, and a password corresponding to said user identification;

determining whether said prefix or suffix corresponds to a confirmation process for confirming that information addressed to said user has been stored in said host computer, said confirmation process being one of a plurality of processes defined for said host computer and respectively corresponding to predefined input alternatives for requesting access to said host computer;

determining whether the information addressed to said user has been stored in said host computer when said prefix or suffix is determined to correspond to said confirmation process;

initiating charges for said user to use said host computer when the information addressed to said user is determined to be stored in said host computer; and disconnecting the one of said terminals from said host computer without initiating charges when it is determined that said information addressed to said user is not stored in said host computer.

* * * * *